United States Patent
Burke

(10) Patent No.: US 9,732,724 B1
(45) Date of Patent: Aug. 15, 2017

(54) RECIPROCATING FLUID ENERGY DEVICE

(71) Applicant: Thomas J. Burke, Anchorage, AK (US)

(72) Inventor: Thomas J. Burke, Anchorage, AK (US)

( * ) Notice: Subject to any disclaimer, the term of this patent is extended or adjusted under 35 U.S.C. 154(b) by 29 days.

(21) Appl. No.: 15/071,704

(22) Filed: Mar. 16, 2016

(51) Int. Cl.
- *F03B 13/00* (2006.01)
- *H02P 9/04* (2006.01)
- *F03B 13/10* (2006.01)
- *F03B 17/06* (2006.01)

(52) U.S. Cl.
CPC .............. *F03B 17/06* (2013.01); *F03B 13/10* (2013.01)

(58) Field of Classification Search
USPC ........................................ 290/42, 54; 60/398
See application file for complete search history.

(56) References Cited

U.S. PATENT DOCUMENTS

| | | | |
|---|---|---|---|
| 830,973 A * | 9/1906 | De Camp | F03B 13/142 416/79 |
| 984,266 A * | 2/1911 | Doney | F25B 9/145 416/64 |
| 3,995,972 A | 12/1976 | Nassar | |
| 4,470,770 A * | 9/1984 | Grose | F03D 5/06 416/79 |
| 5,324,169 A | 6/1994 | Brown et al. | |
| 5,548,956 A | 8/1996 | Price | |
| 6,153,944 A * | 11/2000 | Clark | F03B 17/06 290/54 |
| 6,323,563 B1 | 11/2001 | Kallenberg, Jr. | |
| RE38,336 E * | 12/2003 | Williams | B63B 35/44 415/7 |
| 7,750,491 B2 * | 7/2010 | Sankrithi | F03B 13/264 290/43 |
| 7,977,809 B2 | 7/2011 | Devaney | |
| 8,278,776 B1 * | 10/2012 | Arntz | F03D 5/00 290/54 |
| 8,400,002 B2 | 3/2013 | Gagnon | |
| 8,657,575 B2 | 2/2014 | Morris | |
| 8,916,987 B2 | 12/2014 | Schultz et al. | |
| 8,961,131 B2 | 2/2015 | Trayner et al. | |
| 8,994,203 B2 | 3/2015 | Mulye et al. | |
| 9,006,919 B2 | 4/2015 | Lynch | |
| 9,562,434 B2 * | 2/2017 | Liu | F03B 13/264 |
| 2007/0130929 A1 * | 6/2007 | Khan | F03B 13/185 60/398 |
| 2009/0121490 A1 | 5/2009 | Platzer et al. | |
| 2009/0127861 A1 * | 5/2009 | Sankrithi | F03B 13/264 290/54 |
| 2010/0045046 A1 | 2/2010 | Douglas | |
| 2011/0030361 A1 * | 2/2011 | Gopalswamy | F03D 5/06 60/398 |
| 2012/0171035 A1 | 7/2012 | Fransen | |

(Continued)

*Primary Examiner* — Pedro J Cuevas
(74) *Attorney, Agent, or Firm* — Anthony D. Pellegrini

(57) ABSTRACT

A reciprocating fluid-energy device to be used in a flowing fluid, having a foil, an upstream support member, a downstream support member, and a frame, where the frame retains the device in place within the flowing fluid, the support members movably attach the foil to the frame, and the foil moves laterally back and forth across the direction of the flow of the fluid, with changes in direction of the movement of the foil occurring automatically and spontaneously without external intervention other than the force of the flowing fluid.

37 Claims, 16 Drawing Sheets

(56) References Cited

U.S. PATENT DOCUMENTS

| | | | |
|---|---|---|---|
| 2012/0187694 A1* | 7/2012 | Engervik | F03B 17/06 290/54 |
| 2012/0235417 A1* | 9/2012 | Arntz | F03D 5/00 290/55 |
| 2013/0076036 A1 | 3/2013 | Liu | |

* cited by examiner

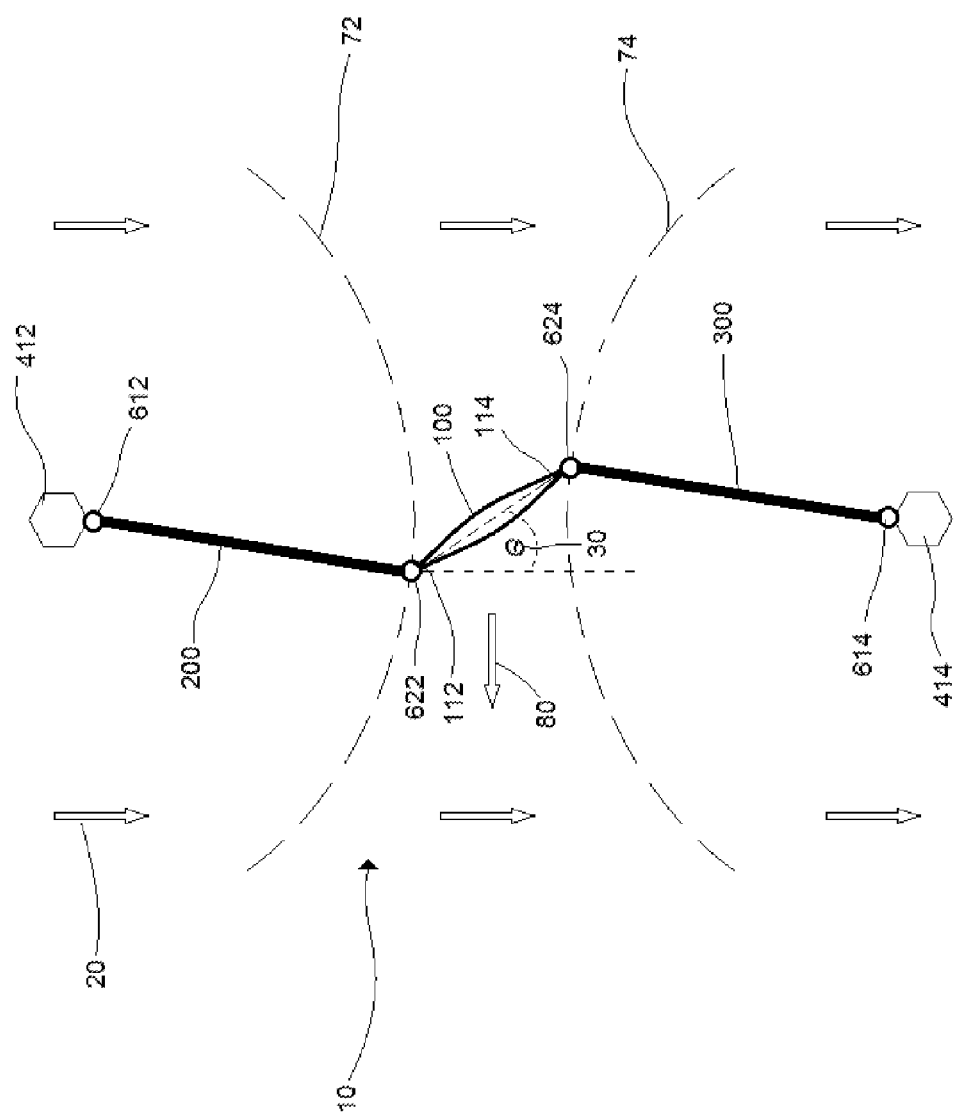

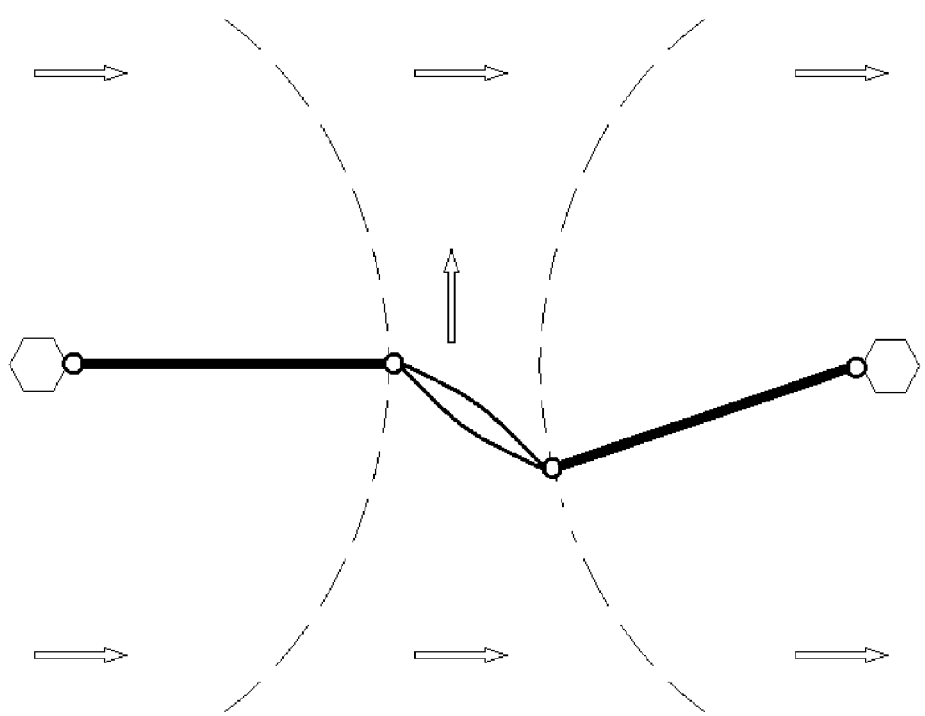

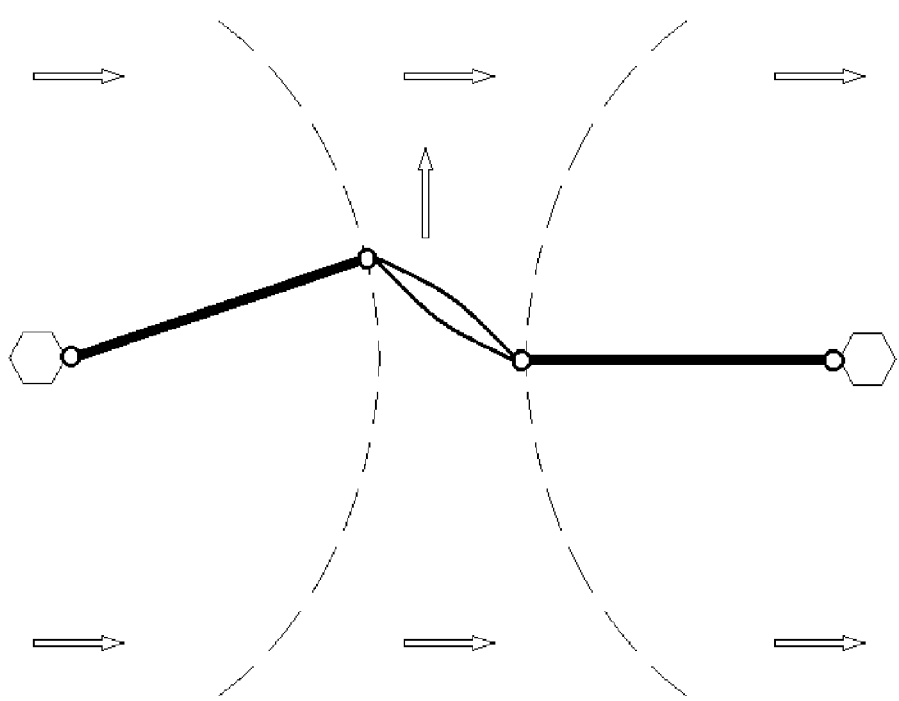

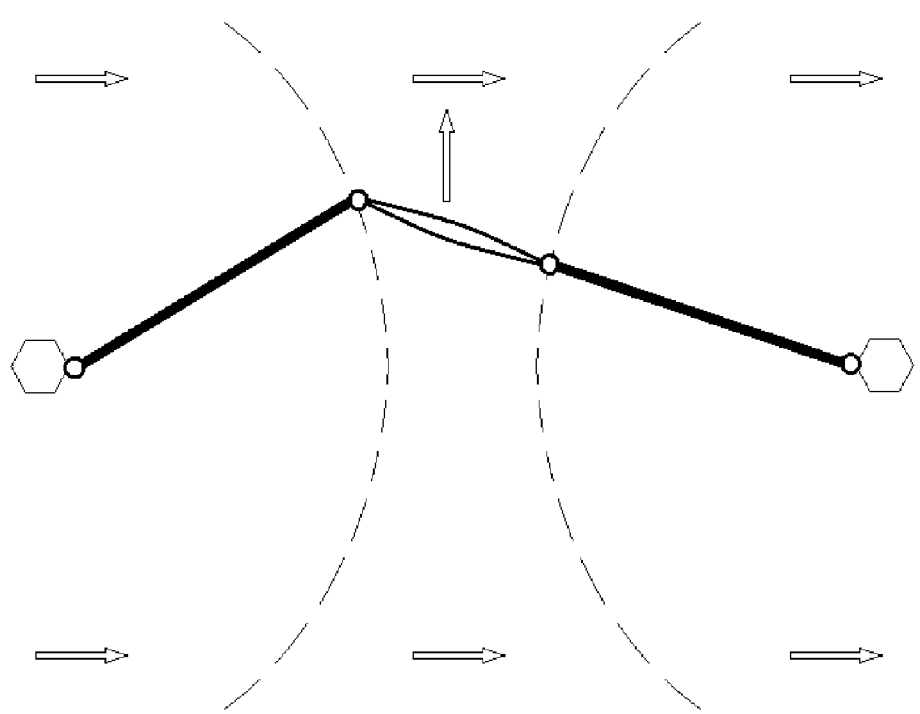

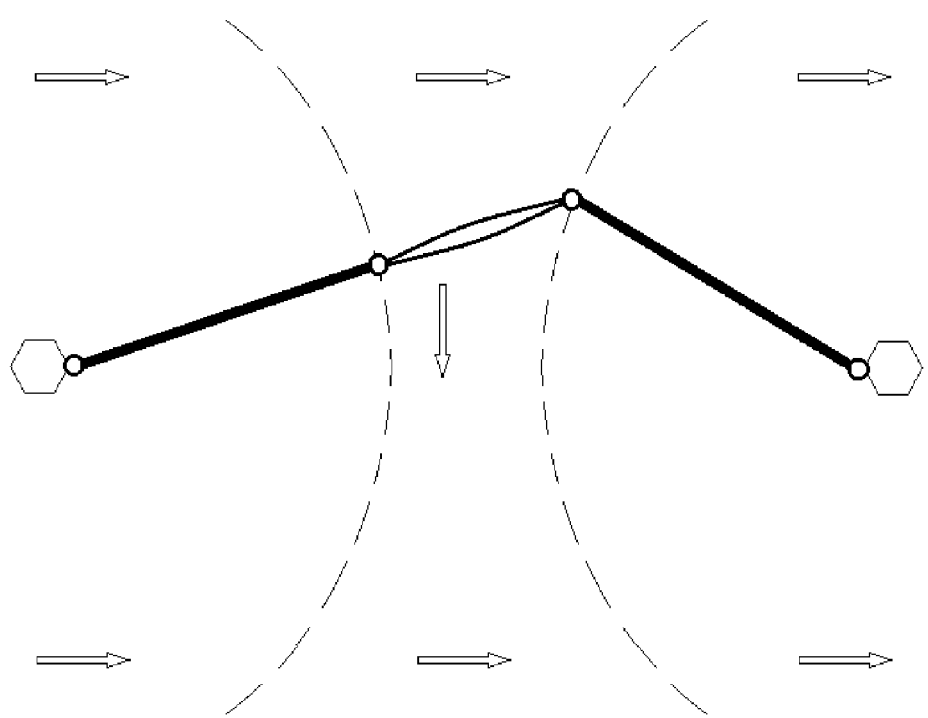

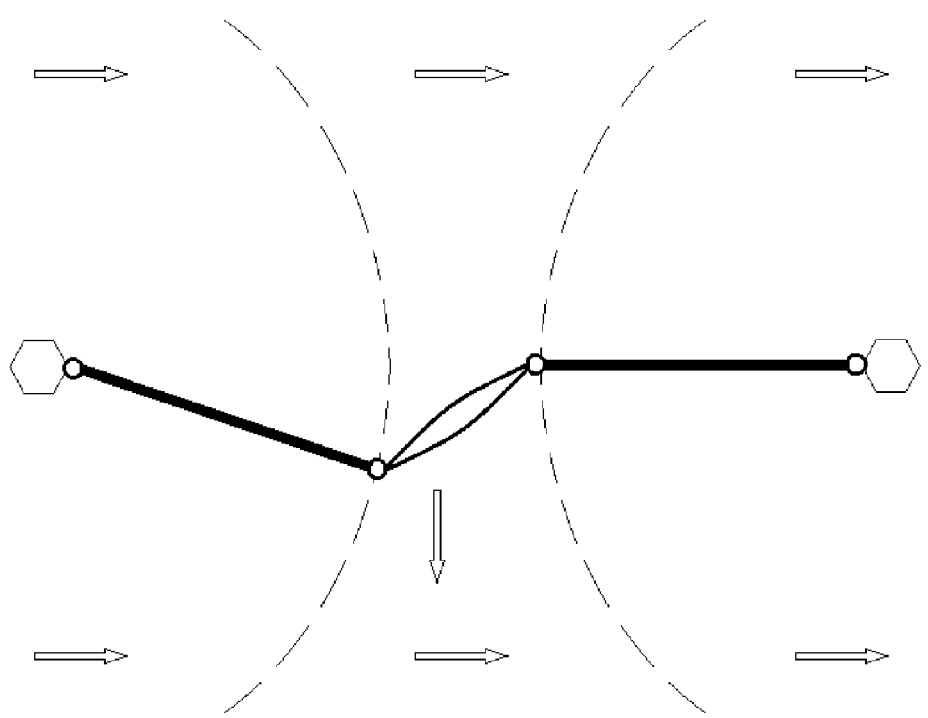

RECIPROCATING FLUID ENERGY DEVICE

BACKGROUND

1. Technical Field

The present invention relates generally to power producing devices and, more particularly, to a low-speed, low-pressure fluid-energy device that captures kinetic energy from the movement of fluid by the use of one or more reciprocating foils.

2. Description of Prior Art

Humans have long derived energy from flowing wind or water. The first great human machines were reciprocating air foils or what are commonly known as sailing ships. Water wheels and windmills represent some of the first machines deriving energy from non-animals sources. Hydro-power became a mature technology in the 1900s. Modern hydro-power has relied on high pressure/high head systems often associated with a dam or a reservoir. This technology has been limited to locations where there was a significant vertical drop for the water. These systems cause significant alteration of the landscape and the eco-system. These factors limit the potential growth of conventional hydro-power.

Wind power matured into a significant industry more recently. Modern wind power is mechanically different from hydro-power in that the moving fluid is low pressure and free flowing. The advancing technology of ever-larger turbines has made this economically viable but it is still limited to locations where there is sufficient average wind speed.

Low-pressure water power or hydrokinetic energy has been largely untapped. Many devices have been tested but they remain economically competitive only where the price of energy is extremely high. Hydrokinetic devices using tides and currents have more reliable and predictable sources of energy than wind power. The energy density of moving water is much higher than moving air, requiring smaller devices. The technology that turns slow moving water into commercial scale power generation will potentially tap one of the largest available sources of mechanical energy on the surface of the earth.

Fluid-energy machines operate by the same physical forces whether the fluid is a gas or liquid, high or low velocity, high or low pressure, high or low density. They incorporate some type of structure which is oriented at an angle of attack relative to the direction of flow of the fluid. Such structure may be a symmetrical foil, an asymmetrical foil, an airfoil, a hydrofoil, a turbine blade, a rotor, a sail, or the like. For simplicity and clarity, all such structures shall be denoted a "foil". The foil has a leading edge and a trailing edge. The angle of attack is the angle formed between the chord line of the foil and the direction of flow of the fluid.

Energy transfer occurs either by drag when the foil and the fluid are moving in the same direction or by lift when the foil moves perpendicularly across the flow of moving fluid. Fluid-energy devices can be reciprocating or rotary. Most rotating machines have continuous power transfer while reciprocating machines can only transfer energy during part of their cycles.

A wind turbine or propeller has an axis of rotation that is collinear with the flow of the fluid. This provides great mechanical simplicity and continuous energy transfer. One important characteristic of this design is that the linear speed of any point on the blade is proportional to the distance from the axis. Commercial wind turbines have adapted to this relationship with large turbines using long contoured blades and high tips speeds (typically 6 to 7 times the wind speed) that remain efficient given sufficient wind speed.

In liquids the length of a rotating blade is limited by this blade speed relationship. Marine propulsion systems increase the width of the blade and its surface area in order to limit blade length. This results in significant turbulence and inefficiency.

To efficiently transfer energy from a slow moving fluid, a large slow moving foil is needed. A consistent relationship between the speed of the foil and the speed of the moving fluid minimizes turbulence and increases efficiency. This cannot be achieved with an axial turbine where blade speed varies by radius.

It is thus shown that there is a need for a device that can harness energy from a low pressure, low speed moving fluid.

It is therefore an objective of the present invention to provide a reciprocating fluid-energy device that can be used with any moving fluid.

It is a further objective of the present invention to provide a reciprocating fluid-energy device that extracts power from slow moving fluids.

It is yet a further objective of the present invention to provide a reciprocating fluid-energy device that extracts power from low pressure fluids.

It is yet a further objective of the present invention to provide a reciprocating fluid-energy device that is simple in design.

It is yet a further objective of the present invention to provide a reciprocating fluid-energy device that is efficient.

It is yet a further objective of the present invention to provide a reciprocating fluid-energy device that automatically and spontaneously reciprocates using only the force of the moving fluid.

It is yet a further objective of the present invention to provide a reciprocating fluid-energy device that is environmentally friendly.

Other features and attendant advantages of the present invention will become obvious to the reader and become fully appreciated as the same becomes better understood when considered in conjunction with the accompanying drawings. It is intended that these objects and advantages are within the scope of the present invention. To the accomplishment of the above and related objects, this invention may be embodied in the form illustrated in the accompanying drawings. Attention being called to the fact, however, that the drawings are illustrative only, and that changes may be made in the specific construction illustrated and described within the scope of this application.

SUMMARY

The present invention embodies a device applicable to all fluids, liquids as well as gases. In one embodiment of the present invention energy transfer occurs by using the lifting force. The device incorporates a reciprocating foil. The lift force is not continuous. Energy is not transferred by drag so all positions of the foil have equal potential energy. For illustration purposes the description will be of device deriving power from moving water, though any moving fluid may be used, such as prevailing winds. The invention consists of a foil and the structures that suspend it in the moving fluid. The structures must allow motion of the foil such that it can traverse the fluid in a reciprocating pattern. The orientation of the foil is determined solely by the possible positions of the leading edge and the trailing edge of the foil and the length of the foil. No other force or device is applied to the foil to create, maintain, or adjust the angle of attack.

The device is placed into a fluid flow. The axis of the device is substantially parallel to the direction of fluid flow.

The device is therefore oriented relative to the "upstream" and "downstream" aspects of the fluid flow. (This could be literally a stream, or a river, or an ocean current, or the like.) The leading edge of the foil is oriented in the upstream direction, while the trailing edge is oriented in the downstream direction. A frame keeps the device positioned in place in the fluid flow. One portion of the frame is located upstream and another portion of the frame is located downstream. An upstream support member movably connects the leading edge of the foil to the upstream portion of the frame, and a downstream support member movably connects the trailing edge of the foil to the downstream portion of the frame. The foil moves laterally across the fluid flow, perpendicular to the direction of the fluid flow, with the support members pivoting laterally as the foil moves. The upstream support member and the downstream support member have a fixed length, as does the foil. The combined lengths of the upstream support member, the downstream support member, and the foil is greater than the distance along the device axis from the upstream portion of the frame to the downstream portion of the frame. In addition, the combined lengths of the upstream support member and the downstream support member is less than the distance along the device axis from the upstream portion of the frame to the downstream portion of the frame. Because of these length relationships, the relative angles between the foil and the support members continuously change as the foil moves laterally across the fluid flow. Moreover, the upstream support member, the foil, and the downstream support member can never be all three simultaneously collinear with each other, thus creating an inherently unstable configuration that \continuously and automatically resets its orientation relative to the fluid flow.

Movement of the foil or other moving components of the device is then harnessed, either to translate that movement into direct work (such as operating a pump or a mill) or to convert that movement into electricity (for example, by powering a generator).

Automatic reciprocating movement of the foil occurs as follows:

When the angle of attack of the foil is greater than zero and oriented to the right of the device axis (that is, the leading edge is oriented to the right of the trailing edge relative to a central longitudinal axis running parallel to the direction of fluid flow), the foil will move to the right due to lift forces. When the angle of attack is greater than zero and oriented to the left of the device axis, the foil will move to the left due to lift forces. When the angle of attack is zero (that is, the leading edge and the trailing edge are parallel to the device axis), lift forces cease acting on the foil and only drag forces act on the foil, biasing the foil in a downstream direction.

Because the upstream end of the upstream support member is pivotally connected to the frame of the device at a fixed location, the upstream support member pivots to the left and right as the foil moves laterally, with the end of the upstream support member connected to the leading edge of the foil tracing an arc 72. Similarly, the downstream support member pivots to the left and right from its connection point with the frame as the foil moves laterally, with its end connected to the trailing edge of the foil also tracing an arc 74. The two arcs 72,74 traced by the upstream and downstream support members are mirror images of each other, and are closest to each other at the midpoint of the lateral traverse of the foil. As the foil moves laterally across the fluid flow, the leading and trailing edges of the foil follow their respective arcs 72,74.

As the foil moves rightward, towards the midpoint of its traverse, the leading edge of the foil follows its arc in a downstream direction and the trailing edge of the foil follows its arc in an upstream direction. See FIG. 2A. This "flattens" the orientation of the foil (tending it towards an orientation perpendicular of the direction of fluid flow), increasing its angle of attack. Once the leading edge of the foil moves to the right of the midpoint of its traverse it moves in an upstream direction, following its arc. See FIG. 2B. Similarly, once the trailing edge of the foil is to the right of the midpoint of its traverse it moves in a downstream direction, following its arc. Once the entire foil is beyond the midpoint of its traverse, where the leading edge of the foil moves in an upstream direction while the trailing edge of the foil moves in a downstream direction, the foil begins to "straighten up" (tending towards an orientation parallel to the direction of fluid flow), reducing the angle of attack towards zero.

However, before the angle of attach reaches zero, the foil become collinearly aligned with the downstream support member. See FIG. 2C. This represents the furthest rightward extent of the leading edge of the foil—the leading edge of the foil cannot move further to the right nor further upstream along its arc. Since there is still a positive angle of attack, though, the foil continues its overall rightward movement. The trailing edge of the foil continues moving to the right, but the leading edge of the foil is pulled downstream along its arc and thus reverses itself and begins moving to the left. The overall movement of the foil continues rightward—with the leading edge of the foil now moving to the left while the trailing edge of the foil continues to move to the right—until the angle of attack is zero and the foil is aligned parallel to the direction of the fluid flow. See FIG. 2D.

In the absence of lift forces when the angle of attack is zero, only drag forces act on the foil, moving the foil in a downstream direction. In moving in a downstream direction, the leading edge of the foil moves to the left along its arc, while the trailing edge of the foil moves to the right along its arc. The foil is thus no longer parallel to the direction of fluid flow but rather has established a new angle of attack, in the opposite direction, and thus the overall movement of the foil begins in a leftward direction. The leading and trailing edges of the foil continue to move in opposite directions while the foil moves to the left until the upstream support member and the foil are collinearly aligned. See FIG. 2E. This represents the furthest rightward extent of the trailing edge of the foil—it cannot move any further to the right nor any further downstream. Since there is a positive angle of attack the foil continues its overall leftward movement. The leading edge of the foil continues to move to the left, and the trailing edge of the foil is pulled upstream and thus reverses itself and begins moving to the left as well. See FIG. 2F.

Now both the leading edge and the trailing edge of the foil move to the left, as does the foil. Movement to the left continues in the same manner as described above, with the foil first "flattening" and then "straightening up", see FIGS. 2G and 2H, until the foil reaches the leftmost extent of its traverse and the angle of attack is zero. See FIG. 2I. The foil reverses in the same manner as described above, with first the leading edge of the foil reversing to the right and then the trailing edge of the foil reversing to the right. See FIG. 2J. Movement of the foil continues as described above.

In summary, the lift force acting on the foil moves the foil across the midline and to the lateral extent of travel (either to right or left) where the angle of attack is reduced to zero degrees and the lift force ceases. In this position the drag/ drift force dominates and the downstream motion will always move the leading edge back toward the midline and the trailing edge away from the midline, creating a new angle of attack that is always opposite in direction to the prior angle of attack. This reversal of direction of movement of first the leading edge of the foil and then the trailing edge of the foil, as described above, occurs automatically and spontaneously because of the force of the moving fluid and the relationship of the positions of the upstream and downstream support members to the foil. The foil reciprocates between the two extreme positions where the angle of attack of the foil is zero. This feature is unique in the art. Other devices using reciprocating movement of a foil either require an external mechanism to reorient the foil to allow for movement in the opposite direction, such as a motor or an actuator, or require the foil to strike a surface, with the impact reorienting the foil. Neither of these prior art methods are as simple and efficient as reversal mechanism of the present invention.

The present intervention, in its simplest embodiment, requires only 3 moving parts—the foil, the upstream support member, and the downstream support member. These moving parts are connected to the frame at a minimum of two points. The simplest of the connections is no more complex than a pivot around a single axis. This configuration is far simpler than other known devices.

The geometry of the invention requires that each of the moving components freely articulates at all of its connections to other components. This means that all forces on the moving parts are either tensile or compression. There is no bending or sheer force except that exerted directly on the foil by the moving fluid. At the end of each lateral traversal the foil (and the upstream and downstream support members) is decelerated—as the angle of attack goes to zero the lift forces decrease and movement slows—and then after reversal the foil (and upstream and downstream support members) is accelerated in the opposite direction. There are no solid or mechanical endpoints to the motion. Shock forces are thereby minimized.

Because the device of the present invention may be symmetric in structure, motion, and function, as long as the axis of the device is aligned with the direction of the fluid flow the foil will reciprocate and transfer energy even if the direction of the fluid flow is reversed. This is particularly useful for implementation in tidal regions, where the tidal flow reverses twice a day.

Devices with high velocity foils create tremendous turbulence and inefficiency when interfacing with slow moving fluids. Efficiency in this setting requires a large surface area foil moving at a speed not significantly different than the moving fluid itself. The present invention provides just such a low velocity/high surface area solution for settings such as hydro-kinetic power or wind energy.

Previous fluid-energy devices have relied either on high velocity fluid such as wind turbines or high pressure fluid such as hydro-electric power. There can be significant kinetic energy in the movement of slow moving fluids if the fluid is of significant volume or density. The current known art has not been able to use this source of power on a commercial scale. The present invention provides simplicity and structural reliability that would allow it to be built on a scale that could be economically successful with low velocity fluids. Moreover, a slower moving foil, even one large enough to transfer economically significant quantities of energy, would cause less environmental disruption than a high velocity foil or a high pressure design. This is most easily appreciated when compared to current hydro-electric systems. The present invention could be placed at multiple locations along a river without the need for a precipitous drop. The invention would require no dam and no reservoir and would have minimal effect on fish.

Other features and advantages of the invention are described below.

DESCRIPTION OF THE DRAWINGS

FIG. 1 is a schematic plan top view of one embodiment of the invention.

FIGS. 2A through 2J demonstrate the automatic reciprocating movement of the foil, as follows:

FIG. 2A shows the foil moving laterally to the right due to lift forces acting on the foil; both the leading edge of the foil and the trailing edge of the foil are moving to the right, and both the upstream support member and the downstream support member are pivoting to the right (the upstream support member in a counterclockwise rotation and the downstream support member in a clockwise rotation). In this arbitrary starting position, the upstream support member is oriented substantially parallel to the direction of fluid flow.

FIG. 2B shows the foil continuing to move to the right. Both the upstream support member and the downstream support member continue to pivot to the right. The downstream support member is now oriented substantially parallel to the direction of fluid flow.

FIG. 2C shows the foil continuing to move to the right. In this position, the foil and the downstream support member are in alignment and the leading edge of the foil is at its rightmost position. The leading edge of the foil cannot travel any further to the right. Therefore, the leading edge of the foil stops moving, while the trailing edge of the foil continues to move to the right. The leading edge then reverses itself and begins to move to the left as the foil continues to have an overall movement to the right to arrive at the orientation shown in FIG. 2D.

FIG. 2D shows the foil in the neutral position; the foil is now oriented substantially parallel to the direction of fluid flow. The leading edge of the foil has moved leftward, while the trailing edge of the foil continues to move to the right. In this orientation no lift forces act on the foil. Drag/drift forces parallel to the fluid flow now act on the foil, biasing it in a downstream direction.

FIG. 2E shows the foil beginning its movement to the left; the leading edge of the foil continues to move to the left, while the trailing edge of the foil stops moving. In this position, the foil and the upstream support member are in alignment and the trailing edge of the foil is at its rightmost position, such that the trailing edge of the foil cannot travel any further to the right. The trailing edge therefore reverses itself and begins to move to the left as the foil moves to the orientation shown in FIG. 2F. The transition from the orientation of the foil shown in FIG. 2D to the orientation of the foil shown in FIG. 2E demonstrations the reciprocation of the foil; note that the foil reciprocates automatically, without resort to mechanical reorienting or the foil rebounding off a surface.

FIG. 2F shows the foil moving laterally to the left; both the leading edge of the foil and the trailing edge of the foil are moving to the left, and both the upstream support member and the downstream support member are pivoting to the left (the upstream support member in a clockwise rotation and the downstream support member in a counterclockwise rotation).

FIG. 2G shows the foil continuing to move to the left. Both the upstream support member and the downstream support member continue to pivot to the left.

FIG. 2H shows the foil continuing to move to the left; the leading edge of the foil stops moving, while the trailing edge of the foil continues to move to the left. In this position, the foil and the downstream support member are in alignment and the leading edge of the foil is at its leftmost position. The leading edge of the foil cannot travel any further to the left. The leading edge therefore reverses itself and begins to move to the right as the foil moves to the orientation shown in FIG. 2I.

FIG. 2I shows the foil in the neutral position; the leading edge of the foil has moved rightward, while the trailing edge of the foil continues to move to the left. In this orientation no lift forces act on the foil. Drag/drift forces parallel to the fluid flow now act on the foil, biasing it in a downstream direction.

FIG. 2J shows the foil beginning its movement to the right; the leading edge of the foil moves to the right, while the trailing edge of the foil stops moving. In this position, the foil and the upstream support member are in alignment and the trailing edge of the foil is at its leftmost position and the trailing edge of the foil cannot travel any further to the left. The trailing edge of the foil therefore reverses itself and begins to move to the right as the foil moves to the orientation shown in FIG. 2A. The transition from the orientation of the foil shown in FIG. 2I to the orientation of the foil shown in FIG. 2J demonstrations the reciprocation of the foil in the opposite direction. As should be made clear from the foregoing, the movement of the foil shown in Figures F through J is the mirror image of the movement of the foil shown in Figures A through E. As long as the fluid flow continues, the foil will continue to reciprocate.

DETAILED DESCRIPTION OF THE INVENTION

Figure 2D:
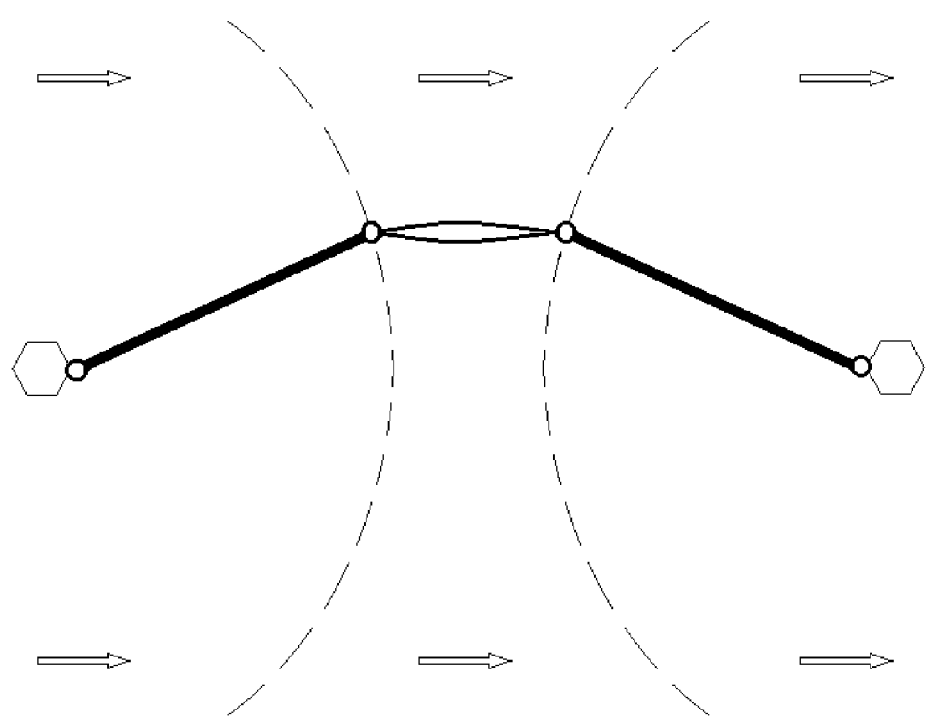
Figure 2F:
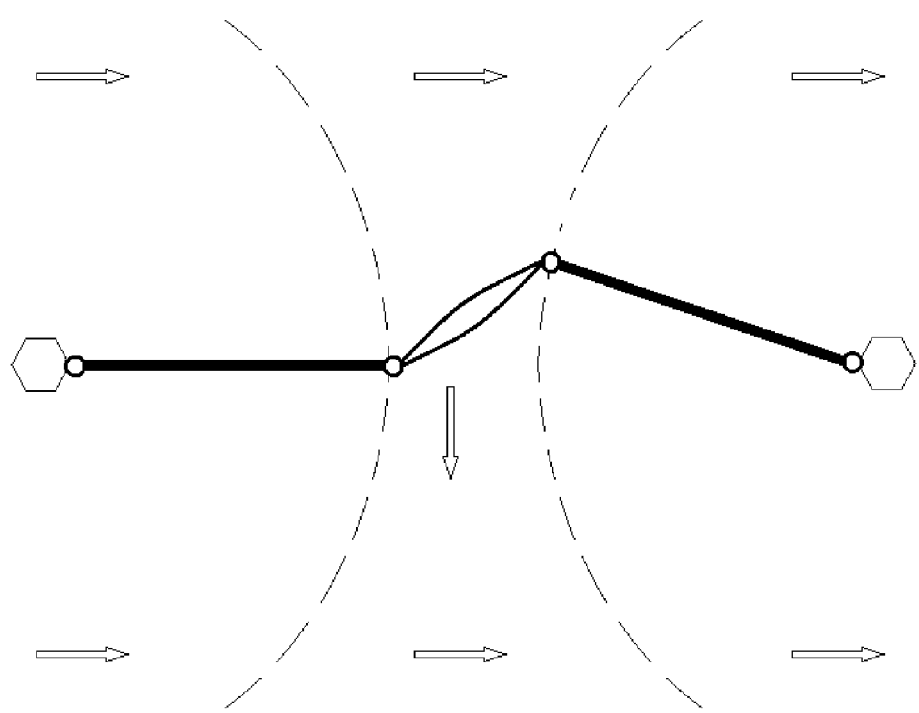
Figure 2H:
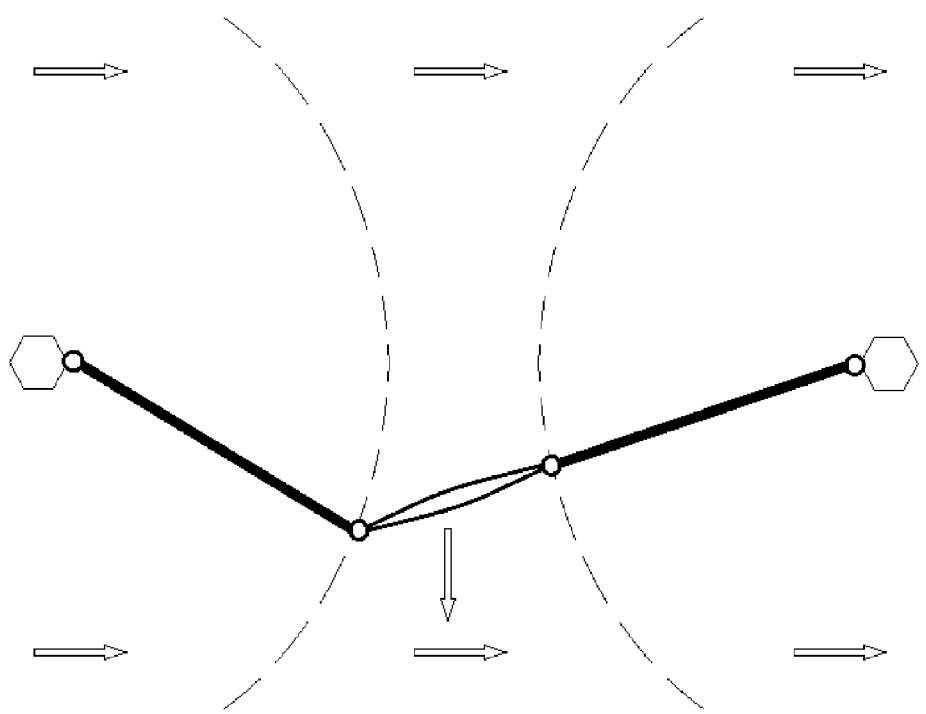
Figure 21:
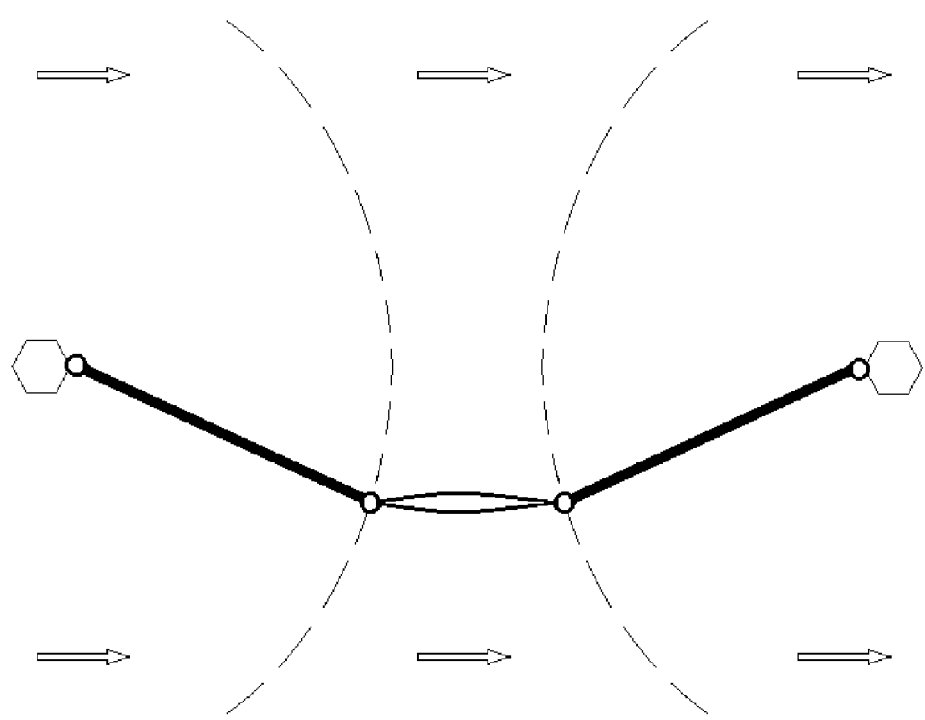
Figure 2J:
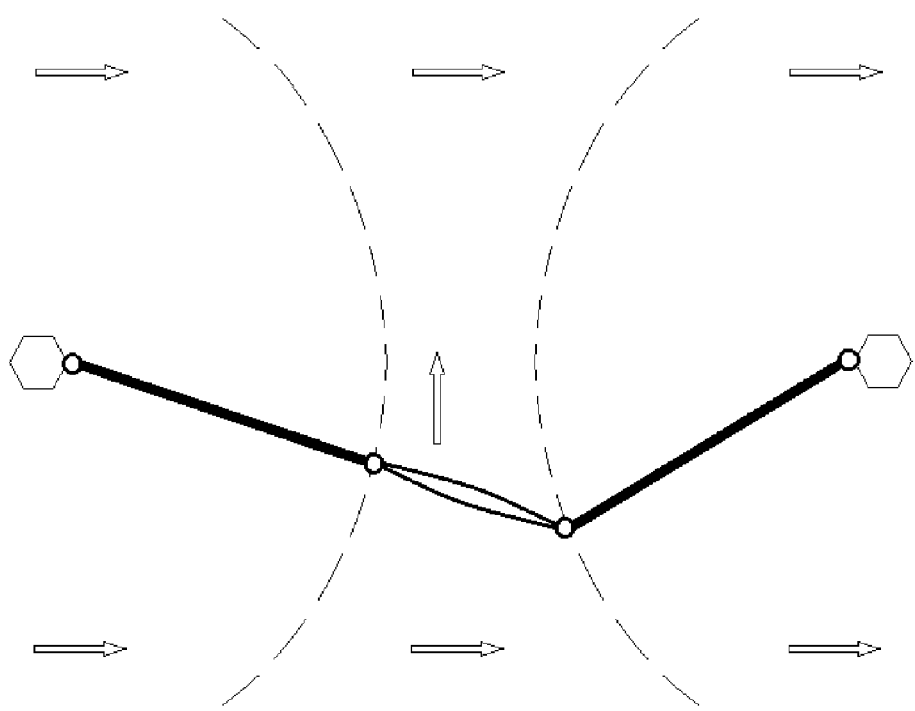

In one embodiment, the present invention discloses a reciprocating device 10 for extracting energy from a fluid flow 20. The fluid flow 20 may be water, air, or any other fluid. The device 10 comprises a foil 100, an upstream support member 200, a downstream support member 300, and a frame 400. Optionally, it also comprises a force transfer mechanism 500 and a generator 700.

A foil creates lift when fluid passes over its surfaces. The leading edge of the foil splits the fluid, with one component of the split fluid running along one surface of the foil and a second component of the split fluid running along the opposite surface of the foil. When the foil is angled relative to the direction of fluid flow (the "angle of attack"), the component of the fluid passing over the surface of the foil angled away from the direction of fluid flow moves faster than the component of the fluid passing over the surface of the foil angled towards the direction of fluid flow. Because of the Bernoulli Effect, which provides that faster moving fluid exerts less pressure than slower moving fluid, the net pressure differential creates "lift" in the direction of the angle of attack, perpendicular to the direction of fluid flow.

The foil 100 of the present invention must be configured to be capable of being oriented at an angle of attack 30 relative to the fluid flow 20. The foil 100 has a leading edge 112 and a trailing edge 114. The leading edge 112 of the foil 100 is oriented in the upstream direction of the fluid flow 20 and the trailing edge 114 of the foil 100 is oriented in the downstream direction of the fluid flow 20. The surfaces of the foil 100 may be curved from the leading edge 112 to the trailing edge 114, forming a convex profile. The foil 100 may be asymmetric, whereby its profile at its leading edge 112 differs from its profile at its trailing edge 114, for example, having an elongate teardrop shape. Such a configuration is appropriate where the fluid flow 20 is unidirectional, for example, the current of a stream or river. The foil 100 may also be configured symmetrically, whereby its profile at its leading edge 112 is substantially the same as its profile at its trailing edge 114. Such a configuration is appropriate where the fluid flow 20 is bidirectional, for example, ocean 50 tidal currents. Preferably, the foil 100 has a hydrofoil configuration when used in liquid fluids and an airfoil configuration when used in gas fluids. Such configurations are well known in the art.

The foil 100 of the present invention also is required to have an upstream connection point 122 and a downstream connection point 124, whereby the foil 100 is connected to the rest of the device 10. The upstream connection point 122 of the foil 100 is located proximate to the leading edge 112 of the foil 100, and the downstream connection point 124 of the foil 100 is located proximate to the trailing edge 114 of the foil.

The upstream support member 200 of the device 10 is elongate and has a first end 212 and a second end 214. It may be either substantially rigid or substantially flexible. A flexible upstream support member 200 works because the force of the fluid flow 20 will tend to move the upstream support member 200 away from its attachment to the frame 400, elongating it to its full length, so that the upstream support member 200 will retain its full length (obviously, a rigid upstream support member 200 retains its full length as well). An example of a flexible upstream support member 200 is one constructed of a chain 250. An example of a rigid upstream support member 200 is one constructed of an elongate rod 240. Other configurations are also contemplated. In any configuration the upstream support member 200 has a frame connection point 222 located proximate to the first end 212 of the upstream support member 200 and a foil connection point 224 located proximate to the second end 214 of the upstream support member 200. The frame connection point 222 of the upstream support member 200 is in pivotal connection with the frame 400 of the device. In one embodiment an upstream pivot 612 is interposed between the frame connection point 222 of the upstream support member 200 and the frame 400 of the device. Similarly, the foil connection point 224 of the upstream support member 200 is in pivotal connection with the upstream connection point 122 of the foil 100. In one embodiment a leading edge pivot 622 is interposed between the foil connection point 224 of the upstream support member 200 and the upstream connection point 122 of the foil 100.

Figure 6:
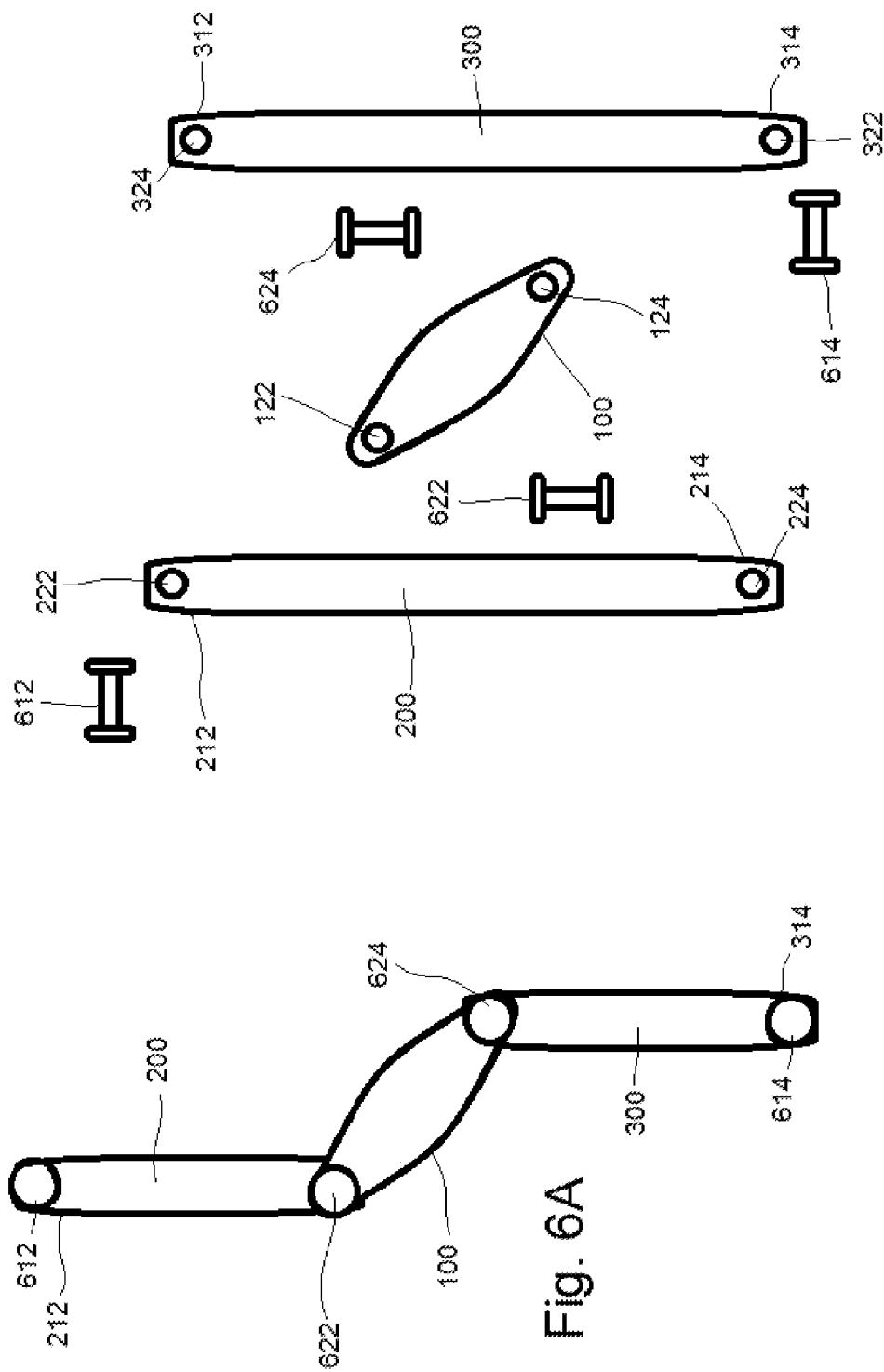
FIG. 6A is a top plan view of an embodiment of the foil, the upstream support member, the downstream support member, and the pivots.
FIG. 6B is an exploded view of the embodiment of the invention shown in FIG. 6A.

The downstream support member 300 of the device 10 is elongate and has a first end 312, a second end 314, and a length. Unlike the upstream support member 200, though, the downstream support member 300 must be substantially rigid. This is because the force of the fluid flow 20 will tend to move a flexible downstream support member 300 towards its attachment to the frame, collapsing it, so that a flexible downstream support member 300 will not retain its full length. Only if the downstream support member 300 has sufficient rigidity to offset the force of the fluid flow 20 will it retain its full length. In one embodiment the downstream support member 300 is an elongate rod 340. Other configurations may also be used. The downstream support member 300 has a foil connection point 324 located proximate to the first end 312 of the downstream support member 300 and a frame connection point 322 located proximate to the second end 314 of the downstream support member 300. The frame connection point 322 of the downstream support member 300 is in pivotal connection with the frame 400 of the device. In one embodiment a downstream pivot 614 is interposed between the frame connection point 322 of the downstream support member 200 and the frame 400 of the device. The foil connection point 324 of the downstream support member 300 is in pivotal connection with the downstream connection point 124 of the foil 100. In one embodiment a trailing edge pivot 624 is interposed between the foil connection point 324 of the downstream support member 200 and the downstream connection point 124 of the foil 100. FIG. 6 depicts the relationship of the foil 100, the upstream support member 200, and the downstream support member 300.

Figure 3:
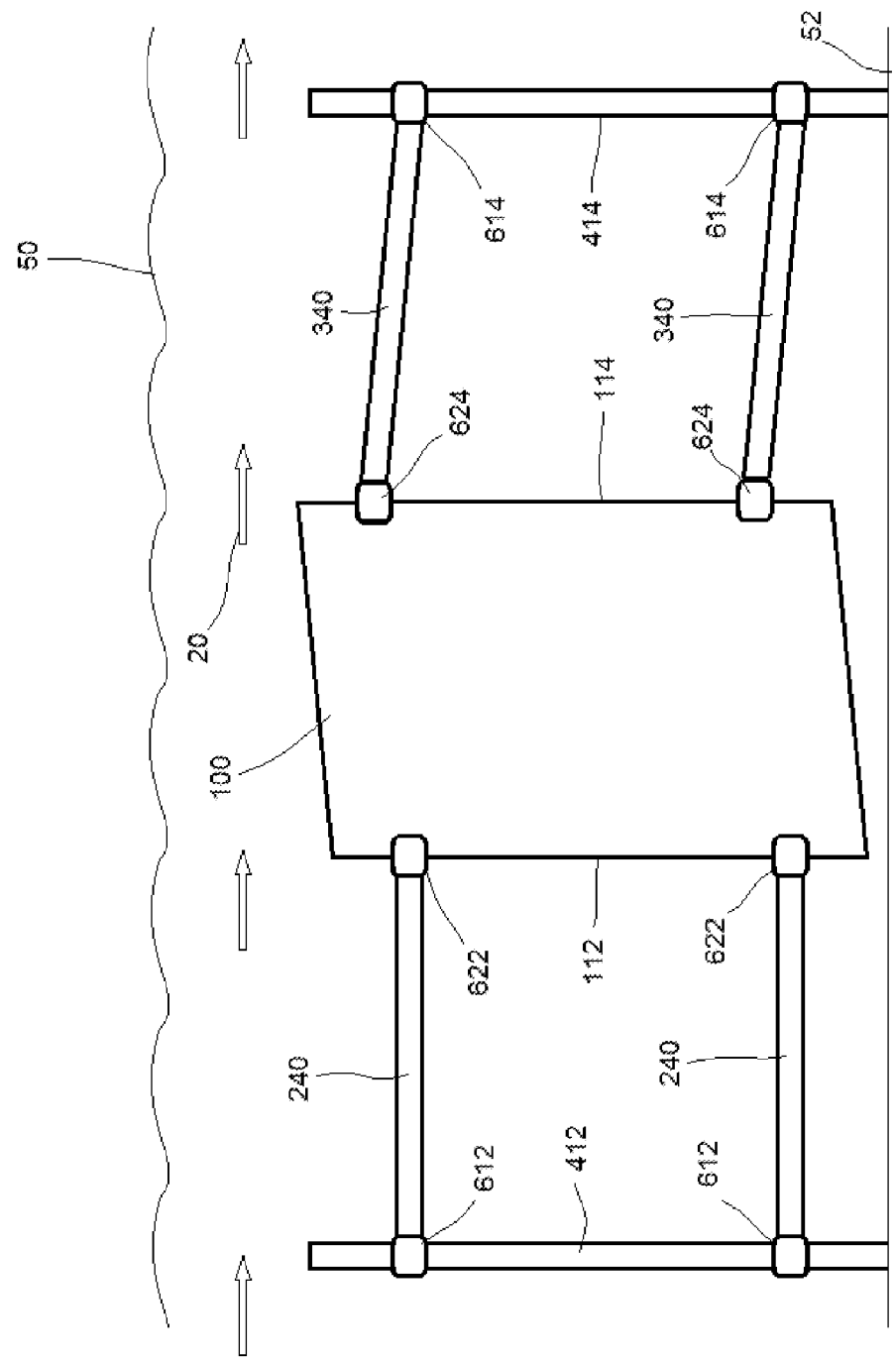
FIG. 3 is a plan side view of an embodiment of the invention depicting multiple upstream support members and multiple downstream support members.
Figure 7:
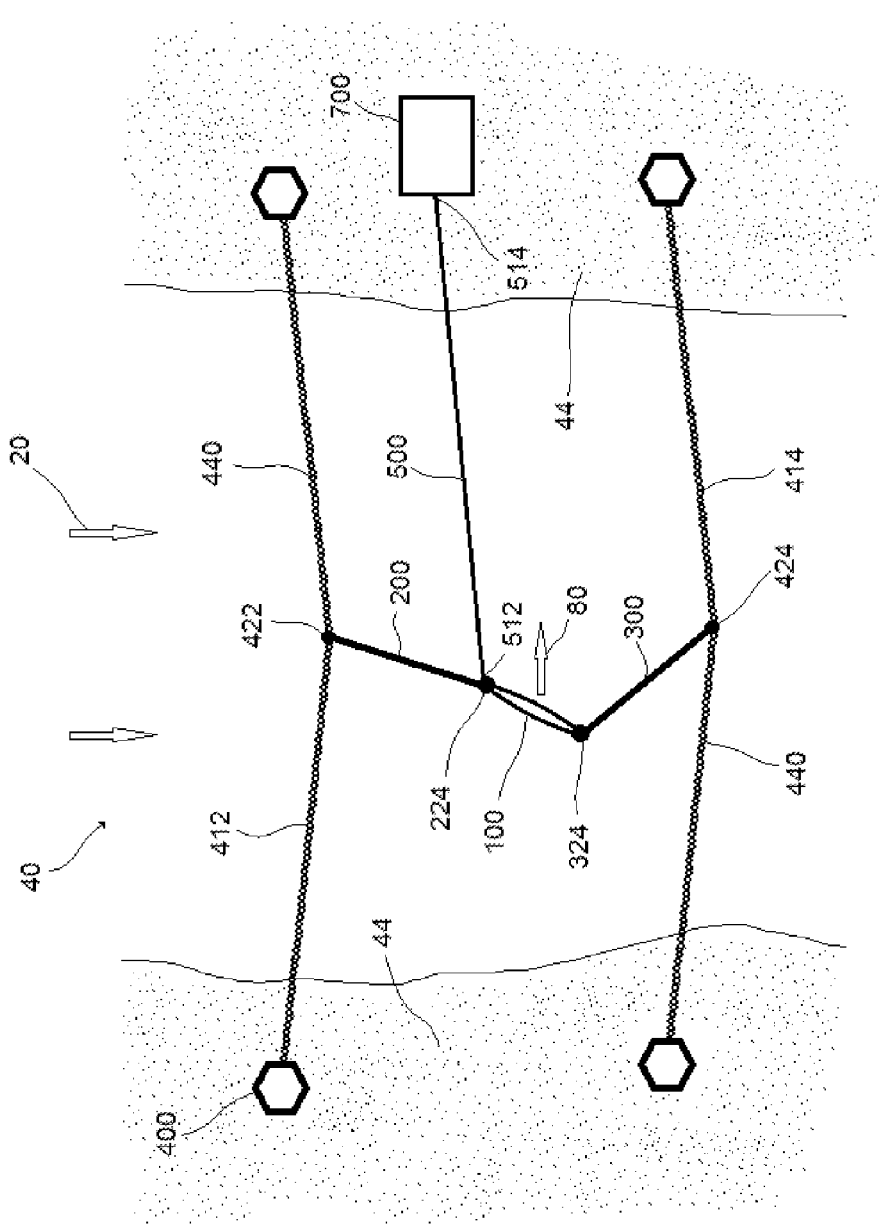
FIG. 7 is a top view of an embodiment of the invention wherein the frame components are stretched across a channeled body of water and anchored to the banks of the channel, and a force transfer mechanism is connected to the foil at its first end and to a generator at its second end.

The frame 400 of the device 10 is a structure suitably configured to be at least partially placed into the fluid flow 20 and to remain in place therein. It may be a unitary structure or a collection of multiple disconnected components. It may be substantially rigid, such as a post or a stanchion, or it may be flexible, such as a chain 440, or a combination of both. In one embodiment the frame 400 is configured to be anchored to the ocean floor 52. See FIG. 3. In another embodiment the frame 400 is configured to be anchored to a riverbed. In yet another embodiment the frame 400 is configured to span a channeled body of water 40, such as a stream, and to be anchored on the banks 44 of the stream, with a portion of the frame 400 extending into the stream. See FIG. 7. The frame 400 may be anchored by simply setting it onto a surface, where its weight holds it in place; alternatively, a portion of the frame may be embedded into a surface; or both. Any other suitable configuration of the frame 400 is also contemplated, provided the frame 400 is capable of retaining the device 10 in place relative to the fluid flow 20.

The frame 400 has an upstream portion 412 and a downstream portion 414. The upstream portion 412 of the frame 400 is oriented in the upstream direction of the fluid flow 20 relative to the foil 100, and is located upstream of the leading edge 112 of the foil 100 relative to the fluid flow 20. The downstream portion 414 of the frame 400 is oriented in the downstream direction of the fluid flow 20 relative to the foil 100 and is located downstream of the trailing edge 114 of the foil 100 relative to the fluid flow 20. Where the frame 400 is a multi-component structure, at least one component of the frame 400 comprises the upstream portion 412 of the frame 400 and at least one other, different component of the frame 400 comprises the downstream portion 414 of the frame 400.

The frame 400 has an upstream connection point 422 located on the upstream portion 412 of the frame 400, and a downstream connection point 424 located on the downstream portion 414 of the frame 400. The upstream connection point 422 of the frame 400 is in pivotal connection with the frame connection point 222 of the upstream support member 200. In one embodiment the upstream pivot 612 is interposed between the upstream connection point 422 of the frame 400 and the frame connection point 222 of the upstream support member 200. The downstream connection point 424 of the frame 400 is in pivotal connection with the frame connection point 322 of the downstream support member 300. In one embodiment the downstream pivot 614 is interposed between the downstream connection point 424 of the frame 400 and the frame connection point 322 of the downstream support member 300. The frame 400 has a frame axis running from the upstream connection point 422 of the frame 400 to the downstream connection point 424 of the frame 400 in a direction substantially parallel to the direction of the fluid flow 20. One configuration of the device 10 disclosing the foil 100, the upstream support member 200, the downstream support member 300, and the frame 400 is shown in FIG. 1.

In order for the device 10 to work properly, each of the lengths of the upstream support member 200, the foil 100, and the downstream support member 300 must be fixed, and combined must be greater than the distance from the upstream connection point 422 of the frame 400 to the downstream connection point 424 of the frame 400 along the frame axis. Also, the combined lengths of the upstream support member 200 and the downstream support member 300 must be less than the distance from the upstream connection point 422 of the frame 400 to the downstream connection point 424 of the frame 400 along the frame axis (i.e., their ends cannot overlap each other). These relationships ensure that the upstream support member 200 and the downstream support member 300 can never be simultaneously collinear with each other, although the foil 100 may be collinear with either the upstream support member 200 or the downstream support member 300.

As such, the foil 100 will always have a non-zero angle of attack 30 relative to the fluid flow 20, allowing for lift forces to act upon it causing it to move laterally 80 relative to the direction of the fluid flow 20, except at the far extremes of the lateral travel of the foil 100. That is, the foil 100 has a neutral position wherein it is oriented substantially parallel to the direction of the fluid flow 20 at its leftmost and the rightmost extents of travel; at the neutral positions, the angle of attack 30 is essentially zero and there are no significant lift forces operating on the foil 100. However, the neutral position is not stable, and drift forces pushing against the foil 100 tend to cause it to "tip" out of the neutral position, thereby creating an angle of attack 30 and the resulting lift forces to cause lateral movement 80 of the foil 100. See FIGS. 2D and 2I. It is the relationship of the upstream support member 200 and the downstream support member 300 to the foil 100 that causes the foil 100 to "tip" in the correct direction to cause the correct lateral movement 80. The movement 80 of the foil 100 towards and then into a neutral position, the subsequent "tipping" of the foil 100 out of the neutral position, and the ensuing movement 80 of the foil 100 towards and then into the other neutral position represents the reciprocating movement defining the device 10. None of this reciprocation requires a force other than the fluid flow 20 to act on the foil 100, nor does it require the foil 100 to rebound off any object in order to reorient itself. Rather, the foil 100 pivots against the upstream support member 200 and the downstream support member 300 as it travels laterally 80, resulting in a smooth transition of the reorientation of the foil 100.

The device 10 may further comprise a force transfer mechanism 500. The force transfer mechanism 500 is any apparatus that is suitably configured to capture at least part of the motion of the device 10 created by the fluid flow 20, and transferring that motion to a machine to do useful work. At the least, the force transfer mechanism 500 has a first end 512 and a second end 514, with the first end 512 in connection with at least one of the foil 100, the upstream support member 200, and the downstream support member 300. The second end 514 of the force transfer mechanism 500 is in connection with the machine doing useful work. The force transfer member 500 may be substantially rigid, such as a rod, or substantially flexible, such as a belt. It may have gearing associated with it. It may translate movement in an oscillating fashion or as rotary movement. However the force transfer mechanism 500 is configured, movement of the foil 100 causes movement of the upstream support member 200 and the downstream support member 300, thereby resulting in movement of the first end 512 of the force transfer mechanism 500. In another embodiment, the first end 512 of the force transfer mechanism 500 may be in connection with at least one of the foil 100, the upstream support member 200, the downstream support member 300, the upstream pivot 612, the downstream pivot 614, the leading edge pivot 622, and the trailing edge pivot 624. Movement of the foil 100 causes movement of the upstream support member 200, the downstream support member 300, the upstream pivot 612, the downstream pivot 614, the leading edge pivot 622, and the trailing edge pivot 624, thereby resulting in movement of the first end 512 of the force transfer mechanism 500.

The machine to do useful work may be a pump or a grinding mill or some other such machine that directly receives the kinetic energy transferred by the force transfer mechanism 500. In the preferred embodiment it is a generator 700. In such embodiment the second end 514 of the force transfer mechanism 500 is in connection with the generator 700. The generator 700 is suitably configured to convert movement of the force transfer mechanism 500 into power. Movement of the force transfer mechanism 500 therefore causes the generator 700 to generate power. Generators 700 which are capable of converting reciprocating motion into power are well known in the art and are not herewith further described.

As described above, and as shown in FIGS. 1, 2A through 2J, 3, 5, and 7, the device 10 may be oriented within the fluid flow 20 such that the lateral movement of the foil 100 is from side to side (i.e., from river bank 44 to river bank 44). However, there is nothing preventing the device from being oriented within the fluid flow 20 such that the lateral movement of the foil 100 is from top to bottom (i.e., from ocean surface to ocean floor 52). The lateral movement of the foil 100 could also be a diagonal path. Essentially, the lateral movement of the foil 100 can take place in any linear direction across a plane perpendicular to the direction of the fluid flow 20.

In another embodiment of the invention, where the fluid medium is water, the foil 100 may be buoyant. As such, the foil 100 floats on or near the surface of the water. In this embodiment the foil 100 may be a boat 60. The leading edge 112 of the foil 100 is the bow portion 62 of the boat 60, and the trailing edge 114 of the foil 100 is the stern portion 64 of the boat 60. The upstream support structure 200 may be a chain 250 or a rope, attached to the bow 62 and anchored onto a piling or mooring ball, which constitutes the upstream portion 412 of the frame 400. Similarly, a traditional boat anchor may constitute the upstream portion 412 of the frame 400 and the boat's anchor rode may constitute the upstream support member 200. A rigid downstream support member 300 is pivotally connected to the stern 64 and pivotally connected to the downstream portion 414 of the frame 400. See FIG. 5. The boat 60 moves laterally across the surface of the water. A force transfer mechanism 500 may be attached to the boat 60 and connected to a generator 700, so that the reciprocating motion of the boat 60 can be used to generator electricity.

In yet another embodiment of the invention, the upstream support member 200 is comprised of a plurality of elongate rods 240, and the downstream support member 300 is comprised of a plurality of elongate rods 340. See FIG. 3. In this configuration the foil 100 is substantially planar, having an appropriately curved cross section. The foil 100 moreover has a plurality of upstream connection points 122 corresponding to the plurality of elongate rods 240 of the upstream support member 200, and has a plurality of downstream connection points 124 corresponding to the plurality of elongate rods 340 of the downstream support member 300. Similarly, the frame 400 has a plurality of upstream connection points 422 corresponding to the plurality of elongate rods 240 of the upstream support member 200, and has a plurality of downstream connection points 424 corresponding to the plurality of elongate rods 340 of the downstream support member 300. Each elongate rod 240 of the upstream support member 200 has a first end, a second end, a frame connection point, and a foil connection point. These elements are located and function as described above. Each elongate rod 340 of the downstream support member 300 also has a first end, a second end, a frame connection point, and a foil connection point. These elements are located and function as described above.

In the foregoing configuration, the force transfer mechanism 500 (if present) may be in connection with at least one of the foil 100, one or more of the elongate rods 240 of the upstream support member 200, and one or more of the elongate rods 340 of the downstream support member 300. Movement of the foil 100 causes movement of the elongate rods 240 of the upstream support member 200 and movement of the elongate rods 340 of the downstream support member 300, thereby resulting in movement of the force transfer mechanism 500. Where a plurality of upstream pivots 612, downstream pivots 614, leading edge pivots 622, and trailing edge pivots 624 are used, the force transfer mechanism 500 may be in connection with one or more of these as well. In a variation of this embodiment, the upstream support member 200 may constitute a plurality of chains 250 rather than elongate rods 240. In all other respects the device 10 is configured the same.

Figure 4:
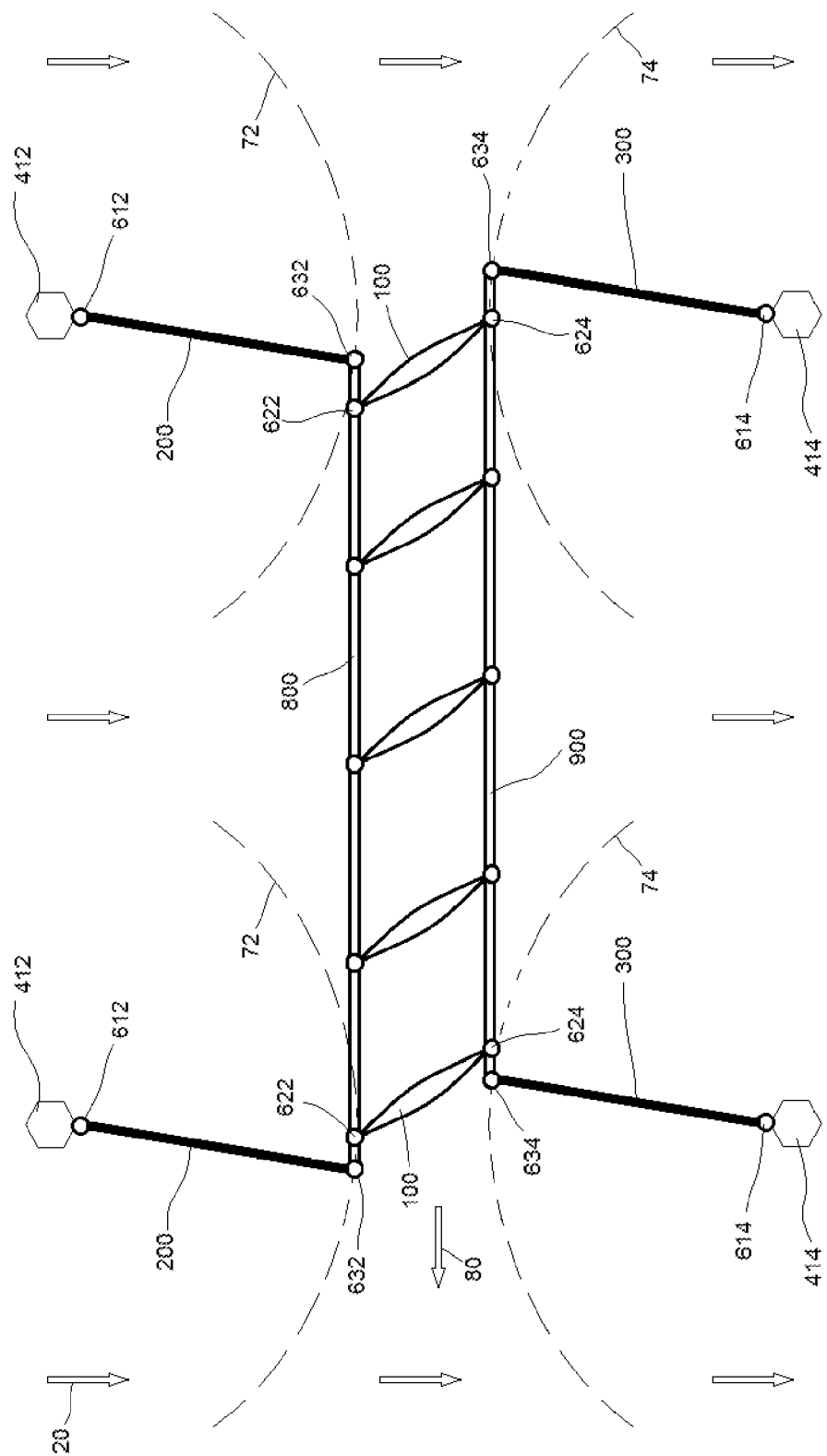
FIG. 4 is a top plan view of an embodiment of the invention depicting multiple foils, a pair of upstream support members, and a pair of downstream support members.
Figure 5:
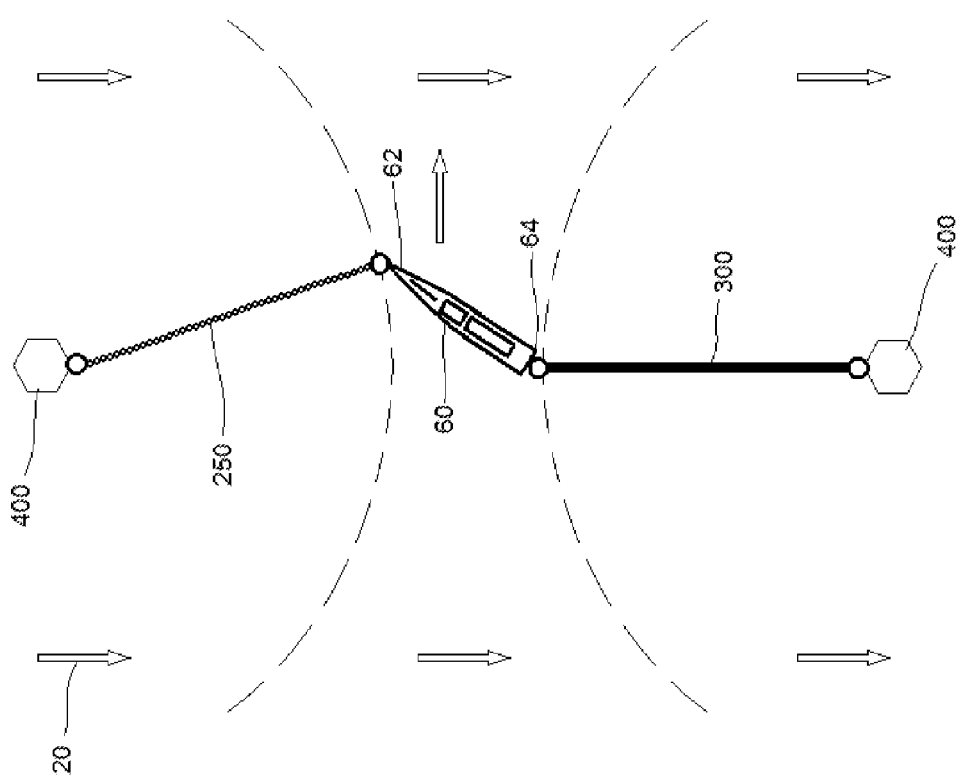
FIG. 5 is a top plan view of an embodiment of the invention wherein the foil is a boat and the upstream support member is a chain.

In yet another embodiment of the invention, the device 10 comprises a plurality of foils 100. See FIG. 4. Each of the plurality of foils 100 is configured as described above. However, instead of the foils 100 being attached directly to the upstream support member 200 and the downstream support member 300, they are connected to a first foil support member 800 and a second foil support member 900. The first foil support member 800 is elongate and oriented substantially perpendicular to the direction of fluid flow 20. It has a first end, a second end, a pair of upstream support connection points, and a plurality of foil connection points.

One of the upstream support connection points of the first foil support member 800 is located proximate to the first end of the first foil support member 800, while the other of the upstream support connection points of the first foil support member 800 is located proximate to the second end of the first foil support member 800. The plurality of foil connection points of the first foil support member 800 are distributed substantially evenly along the length of the first foil support member 800 and correspond in number to the plurality of foils 100. Each foil connection point of the first foil support member 800 is in pivotal connection with the upstream connection point 122 of a corresponding foil 100 by one of the leading edge pivots 622.

Similarly, the second foil support member 900 has substantially the same size and shape as the first foil support member 800 and is oriented substantially perpendicular to the direction of fluid flow 20. It has a first end, a second end, a pair of downstream support connection points, and a plurality of foil connection points. One of the downstream support connection points of the second foil support member 900 is located proximate to the first end of the second foil support member 900, while the other of the downstream support connection points of the second foil support member 900 is located proximate to the second end of the second foil support member 900. The plurality of foil connection points of the second foil support member 900 are distributed substantially evenly along the length of the second foil support member 900 and correspond in number to the plurality of foils 100. Each foil connection point of the second foil support member 900 is in pivotal connection with the downstream connection point 124 of a corresponding foil 100 by one of the trailing edge pivots 624.

A pair of upstream support members 200 connects the first foil support member 800 to the frame 400, and a pair of downstream support members 300 connects the second foil support member 900 to the frame 400. Each upstream support member 200 has a foil support member connection point, which is in pivotal connection with one of the upstream support connection points of the first foil support member 800 by a first foil support pivot 632. Each downstream support member 300 has a foil support member connection point, which is in pivotal connection with one of the downstream support connection points of the second foil support member 900 by a second foil support pivot 634.

The frame 400 has a pair of upstream portions 412 and a pair of downstream portions 414. Each upstream support member 200 is in pivotal connection with one of the upstream portions 412 of the frame 400 by an upstream pivot 612. Each downstream support member 300 is in pivotal connection with one of the downstream portions 414 of the frame 400 by a downstream pivot 614. In this embodiment, the fluid flow 20 acts upon the plurality of foils 100, causing them to move together substantially perpendicular to the direction of the fluid flow 20 in a reciprocating motion. A force transfer mechanism 500 may be attached to one or more of any of the moving components of the device 10, as described above.

What has been described and illustrated herein is a preferred embodiment of the invention along with some it its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect. Other embodiments not specifically set forth herein are also within the scope of the following claims, whereby modifications and variations can be made to the disclosed embodiments of the present invention without departing from the subject of the invention as defined in the following claims.

I claim:

1. A reciprocating device for extracting energy from a fluid flow, said device comprising
    a foil, an upstream support member, a downstream support member, and a frame;
    with the foil having a configuration capable of being oriented at an angle of attack relative to the fluid flow, said foil having
        a leading edge,
        a trailing edge,
        a length,
        an upstream connection point, and
        a downstream connection point,
        with the leading edge of the foil being oriented in an upstream direction relative to the fluid flow and the trailing edge of the foil being oriented in a downstream direction relative to the fluid flow, and the upstream connection point of the foil being located proximate to the leading edge of the foil and the downstream connection point of the foil being located proximate to the trailing edge of the foil;
    the upstream support member being elongate and having
        a first end,
        a second end,
        a length,
        a frame connection point, and
        a foil connection point,
        with the frame connection point of the upstream support member being located proximate to the first end of the upstream support member and the foil connection point of the upstream support member being located proximate to the second end of the upstream support member, wherein the foil connection point of the upstream support member is in pivotal connection with the upstream connection point of the foil;
    the downstream support member being elongate and substantially rigid and having
        a first end,
        a second end,
        a length,
        a foil connection point, and
        a frame connection point,
        with the foil connection point of the downstream support member being located proximate to the first end of the downstream support member and the frame connection point of the downstream support member being located proximate to the second end of the downstream support member, wherein the foil connection point of the downstream support member is in pivotal connection with the downstream connection point of the foil; and
    the frame being a structure suitably configured to be at least partially placed into the fluid flow and to remain in place therein, having
        an upstream portion,
        a downstream portion,
        an upstream connection point,
        a downstream connection point, and
        a frame axis,
        with the upstream portion of the frame located upstream of the leading edge of the foil relative to the fluid flow, the downstream portion of the frame located downstream of the trailing edge of the foil relative to the fluid flow, the upstream connection point of the frame located on the upstream portion of the frame, the downstream connection point of the frame located on the downstream portion of the frame, and the frame axis running from the upstream connection point of the frame to the downstream connection point of the frame in an orientation substantially parallel to the direction of the fluid flow;

wherein the frame connection point of the upstream support member is in pivotal connection with the upstream connection point of the frame, the frame connection point of the downstream support member is in pivotal connection with the downstream connection point of the frame, the combined lengths of the upstream support member, the foil, and the downstream support member is greater than a distance from the upstream connection point of the frame to the downstream connection point of the frame along the frame axis, and the combined lengths of the upstream support member and the downstream support member is less than the distance from the upstream connection point of the frame to the downstream connection point of the frame along the frame axis;

whereby the fluid flow acts upon the foil, causing the foil to move substantially perpendicular to the direction of the fluid flow in a reciprocating motion.

2. The device of claim 1 wherein the foil has a hydrofoil configuration.

3. The device of claim 2 further comprising a force transfer mechanism;

wherein the force transfer mechanism has a first end and a second end, with the first end in connection with at least one of the foil, the upstream support member, and the downstream support member;

whereby movement of the foil causes movement of the upstream support member and movement of the downstream support member, thereby resulting in movement of the force transfer mechanism.

4. The device of claim 2 further comprising a force transfer mechanism, an upstream pivot, a downstream pivot, a leading edge pivot, and a trailing edge pivot;

wherein the force transfer mechanism has a first end and a second end, with the first end in connection with at least one of the foil, the upstream support member, the downstream support member, the upstream pivot, the downstream pivot, the leading edge pivot, and the trailing edge pivot;

the upstream pivot provides the pivotal connection between the frame connection point of the upstream support member and the upstream connection point of the frame;

the downstream pivot provides the pivotal connection between the frame connection point of the downstream support member and the downstream connection point of the frame;

the leading edge pivot provides the pivotal connection between the foil connection point of the upstream support member and the upstream connection point of the foil; and the trailing edge pivot provides the pivotal connection between the foil connection point of the downstream support member and the downstream connection point of the foil;

whereby movement of the foil causes movement of the upstream support member, the downstream support member, the upstream pivot, the downstream pivot, the leading edge pivot, and the trailing edge pivot, thereby resulting in movement of the force transfer mechanism.

5. The device of claim 3 further comprising a generator, wherein the generator is suitably configured to convert movement into power; and the second end of the force transfer mechanism is in connection with the generator;

whereby movement of the force transfer mechanism causes the generator to generate power.

6. The device of claim 4 further comprising a generator, wherein the generator is suitably configured to convert movement into power; and the second end of the force transfer mechanism is in connection with the generator;

whereby movement of the force transfer mechanism causes the generator to generate power.

7. The device of claim 2 wherein the frame is a unitary substantially rigid structure.

8. The device of claim 7 wherein the fluid flow is a current in a channeled body of water and the frame is anchored to a floor of the channel.

9. The device of claim 7 wherein the fluid flow is an ocean current and the frame is anchored to a floor of the ocean.

10. The device of claim 2 wherein the frame is a multi-component substantially rigid structure, with at least one component of the frame comprising the upstream portion of the frame and at least one other component of the frame comprising the downstream portion of the frame.

11. The device of claim 10 wherein the fluid flow is a current in a channeled body of water and each component of the frame is anchored to a floor of the channel.

12. The device of claim 10 wherein the fluid flow is an ocean current and each component of the frame is anchored to a floor of the ocean.

13. The device of claim 2 wherein the frame is a multi-component flexible structure, with at least one component of the frame comprising the upstream portion of the frame and at least one other component of the frame comprising the downstream portion of the frame.

14. The device of claim 13 wherein the fluid flow is a current in a channeled body of water having dry land banks on either side of the channel and each component of the frame is anchored to the banks on either side of the channel with at least a portion of said component placed within the channel.

15. The device of claim 2 wherein the upstream support member is a substantially rigid structure.

16. The device of claim 15 wherein the upstream support member is an elongate rod, and the downstream support member is an elongate rod.

17. The device of claim 15 wherein the upstream support member is comprised of a plurality of elongate rods;

the downstream support member is comprised of a plurality of elongate rods;

the foil has a plurality of upstream connection points corresponding to the plurality of elongate rods of the upstream support member;

the foil has a plurality of downstream connection points corresponding to the plurality of elongate rods of the downstream support member;

the frame has a plurality of upstream connection points corresponding to the plurality of elongate rods of the upstream support member; and the frame has a plurality of downstream connection points corresponding to the plurality of elongate rods of the downstream support member;

with each elongate rod of the upstream support member having a first end, a second end, a frame connection point, and a foil connection point, with the frame connection point of each elongate rod of the upstream support member being located proximate to the first end of said elongate rod of the upstream support member and the foil connection point of said elongate rod of the upstream support member being located proximate to the second end of said elongate rod of the upstream support member, wherein said frame connection point of said elongate rod of the upstream support member is in pivotal connection with a corresponding upstream connection point of the frame, and said foil connection point of said elongate rod of the upstream support member is in pivotal connection with a corresponding upstream connection point of the foil; and each elongate rod of the downstream support member having a first end, a second end, a frame connection point, and a foil connection point, with the frame connection point of each elongate rod of the downstream support member being located proximate to the first end of said elongate rod of the downstream support member and the foil connection point of said elongate rod of the downstream support member being located proximate to the second end of said elongate rod of the downstream support member, wherein said frame connection point of said elongate rod of the downstream support member is in pivotal connection with a corresponding downstream connection point of the frame, and, said foil connection point of said elongate rod of the downstream support member is in pivotal connection with a corresponding downstream connection point of the foil.

18. The device of claim 17 further comprising a force transfer mechanism;

wherein the force transfer mechanism has a first end and a second end, with the first end in connection with at least one of: the foil, one or more of the elongate rods of the upstream support member, and one or more of the elongate rods of the downstream support member;

whereby movement of the foil causes movement of the elongate rods of the upstream support member and movement of the elongate rods of the downstream support member, thereby resulting in movement of the force transfer mechanism.

19. The device of claim 17 further comprising a force transfer mechanism, a plurality of upstream pivots, a plurality of downstream pivots, a plurality of leading edge pivots, and a plurality of trailing edge pivots;

wherein the force transfer mechanism has a first end and a second end, with the first end in connection with at least one of: the foil, one or more of the plurality of elongate rods of the upstream support member, one or more of the plurality of elongate rods of the downstream support member, one or more of the plurality of upstream pivots, one or more of the plurality of downstream pivots, one or more of the plurality of leading edge pivots, and one or more of the plurality of trailing edge pivots;

each of the upstream pivots provides the pivotal connection between the frame connection point of one of the elongate rods of the upstream support member and a corresponding upstream connection point of the frame;

each of the downstream pivots provides the pivotal connection between the frame connection point of one of the elongate rods of the downstream support member and a corresponding downstream connection point of the frame;

each of the leading edge pivots provides the pivotal connection between the foil connection point of one of the elongate rods of the upstream support member and a corresponding upstream connection point of the foil; and each of the trailing edge pivots provides the pivotal connection between the foil connection point of one of the elongate rods of the downstream support member and a corresponding downstream connection point of the foil;

whereby movement of the foil causes movement of the plurality of elongate rods of the upstream support member, the plurality of elongate rods of the downstream support member, the plurality of upstream pivots, the plurality of downstream pivots, the plurality of leading edge pivots, and the plurality of trailing edge pivots, thereby resulting in movement of the force transfer mechanism.

20. The device of claim 18 further comprising a generator, wherein the generator is suitably configured to convert movement into power; and the second end of the force transfer mechanism is in connection with the generator;

whereby movement of the force transfer mechanism causes the generator to generate power.

21. The device of claim 19 further comprising a generator, wherein the generator is suitably configured to convert movement into power; and the second end of the force transfer mechanism is in connection with the generator;

whereby movement of the force transfer mechanism causes the generator to generate power.

22. The device of claim 2 wherein the upstream support member is a flexible structure.

23. The device of claim 22 wherein the upstream support member is a chain, and the downstream support member is an elongate rod.

24. The device of claim 22 wherein the upstream support member is comprised of a plurality of chains;

the downstream support member is comprised of a plurality of elongate rods;

the foil has a plurality of upstream connection points corresponding to the plurality of chains of the upstream support member;

the foil has a plurality of downstream connection points corresponding to the plurality of elongate rods of the downstream support member;

the frame has a plurality of upstream connection points corresponding to the plurality of chains of the upstream support member; and the frame has a plurality of downstream connection points corresponding to the plurality of elongate rods of the downstream support member;
with each chain of the upstream support member having
a first end,
a second end,
a frame connection point, and
a foil connection point,
with the frame connection point of each chain of the upstream support member being located proximate to the first end of said chain of the upstream support member and the foil connection point of said chain of the upstream support member being located proximate to the second end of said chain of the upstream support member, wherein said frame connection point of said chain of the upstream support member is in pivotal connection with a corresponding upstream connection point of the frame, and said foil connection point of said chain of the upstream support member is in pivotal connection with a corresponding upstream connection point of the foil; and
each elongate rod of the downstream support member having
a first end,
a second end,
a frame connection point, and
a foil connection point,
with the frame connection point of each elongate rod of the downstream support member being located proximate to the first end of said elongate rod of the downstream support member and the foil connection point of said elongate rod of the downstream support member being located proximate to the second end of said elongate rod of the downstream support member, wherein said frame connection point of said elongate rod of the downstream support member is in pivotal connection with a corresponding downstream connection point of the frame, and, said foil connection point of said elongate rod of the downstream support member is in pivotal connection with a corresponding downstream connection point of the foil.

25. The device of claim 24 further comprising a force transfer mechanism;
wherein the force transfer mechanism has a first end and a second end, with the first end in connection with at least one of: the foil and one or more of the elongate rods of the downstream support member;
whereby movement of the foil causes movement of the elongate rods of the downstream support member, thereby resulting in movement of the force transfer mechanism.

26. The device of claim 24 further comprising a force transfer mechanism, a plurality of upstream pivots, a plurality of downstream pivots, a plurality of leading edge pivots, and a plurality of trailing edge pivots;
wherein the force transfer mechanism has a first end and a second end, with the first end in connection with at least one of: the foil, one or more of the plurality of elongate rods of the downstream support member, one or more of the plurality of upstream pivots, one or more of the plurality of downstream pivots, one or more of the plurality of leading edge pivots, and one or more of the plurality of trailing edge pivots;
each of the upstream pivots provides the pivotal connection between the frame connection point of one of the chains of the upstream support member and a corresponding upstream connection point of the frame;
each of the downstream pivots provides the pivotal connection between the frame connection point of one of the elongate rods of the downstream support member and a corresponding downstream connection point of the frame;
each of the leading edge pivots provides the pivotal connection between the foil connection point of one of the chains of the upstream support member and a corresponding upstream connection point of the foil; and
each of the trailing edge pivots provides the pivotal connection between the foil connection point of one of the elongate rods of the downstream support member and a corresponding downstream connection point of the foil;
whereby movement of the foil causes movement of the plurality of elongate rods of the downstream support member, the plurality of upstream pivots, the plurality of downstream pivots, the plurality of leading edge pivots, and the plurality of trailing edge pivots, thereby resulting in movement of the force transfer mechanism.

27. The device of claim 25 further comprising a generator, wherein
the generator is suitably configured to convert movement into power; and
the second end of the force transfer mechanism is in connection with the generator;
whereby movement of the force transfer mechanism causes the generator to generate power.

28. The device of claim 26 further comprising a generator, wherein
the generator is suitably configured to convert movement into power; and
the second end of the force transfer mechanism is in connection with the generator;
whereby movement of the force transfer mechanism causes the generator to generate power.

29. The device of claim 1 wherein the foil is buoyant.

30. The device of claim 29, wherein the foil is a boat, the leading edge of the foil is a bow portion of the boat, and the trailing edge of the foil is a stern portion of the boat.

31. A reciprocating device for extracting energy from a fluid flow, said device comprising
a plurality of foils, a first foil support member, a second foil support member, a pair of upstream support members, a pair of downstream support members, a frame, a pair of upstream pivots, a pair of downstream pivots, a pair of first foil support pivots, a pair of second foil support pivots, a plurality of leading edge pivots, and a plurality of trailing edge pivots;
with each foil having a hydrofoil configuration capable of being oriented at an angle of attack relative to the fluid flow and having substantially the same size and shape as each other foil, with
a leading edge,
a trailing edge,
a length,
an upstream connection point, and
a downstream connection point,
with the leading edge of each foil being oriented in an upstream direction relative to the fluid flow and the trailing edge of each foil being oriented in a downstream direction relative to the fluid flow, and the upstream connection point of each foil being located proximate to the leading edge of said foil and the downstream connection point of each foil being located proximate to the trailing edge of said foil;

the first foil support member being elongate and oriented substantially perpendicular to the direction of fluid flow, and having
a first end,
a second end,
a pair of upstream support connection points, and
a plurality of foil connection points,
with one upstream support connection point of the first foil support member located proximate to the first end of the first foil support member,
the other upstream support connection point of the first foil support member located proximate to the second end of the first foil support member,
the plurality of foil connection points are distributed substantially evenly along the first foil support member and correspond in number to the plurality of foils, with each foil connection point of the first foil support member in pivotal connection with the upstream connection point of one of the foils by one of the leading edge pivots;
the second foil support member being elongate and having substantially the same size and shape as the first foil support member and oriented substantially perpendicular to the direction of fluid flow, and having
a first end,
a second end,
a pair of downstream support connection points, and
a plurality of foil connection points,
with one downstream support connection point of the second foil support member located proximate to the first end of the second foil support member,
the other downstream support connection point of the second foil support member located proximate to the second end of the second foil support member,
the plurality of foil connection points are distributed substantially evenly along the second foil support member and correspond in number to the plurality of foils, with each foil connection point of the second foil support member in pivotal connection with the downstream connection point of one of the foils by one of the trailing edge pivots;
each upstream support member being elongate and having substantially the same size and shape as each other upstream support member, and having
a first end,
a second end,
a length,
a frame connection point, and
a foil support member connection point,
with the frame connection point of each upstream support member being located proximate to the first end of said upstream support member and the foil support member connection point of each upstream support member being located proximate to the second end of said upstream support member, wherein the foil support member connection point of each upstream support member is in pivotal connection with one of the upstream support connection points of the first foil support member by one of the first foil support pivots;
each downstream support member being elongate and substantially rigid and having substantially the same size and shape as each other downstream support member, and having
a first end,
a second end,
a length,
a foil support member connection point, and
a frame connection point,
with the foil support member connection point of each downstream support member being located proximate to the first end of said downstream support member and the frame connection point of each downstream support member being located proximate to the second end of said downstream support member, wherein the foil support member connection point of each downstream support member is in pivotal connection with one of the downstream support connection points of the second foil support member by one of the second foil support pivots; and
the frame being a structure suitably configured to be at least partially placed into the fluid flow and to remain in place therein, having
a pair of upstream portions,
a pair of downstream portions,
an upstream connection point associated with each upstream portion,
a downstream connection point associated with each downstream portion, and
a pair of frame axes,
with each upstream portion located upstream of the leading edges of the plurality of foils relative to the fluid flow,
each downstream portion located downstream of the trailing edges of the plurality of foils relative to the fluid flow,
the upstream connection point associated with each upstream portion located on said upstream portion,
the downstream connection point associated with each downstream portion located on said downstream portion,
one frame axis running from one upstream connection point to one downstream connection point in a direction substantially parallel to the direction of the fluid flow, and
the other frame axis running from the other upstream connection point to the other downstream connection point in a direction substantially parallel to the direction of the fluid flow, with the two frame axes substantially parallel to each other,
wherein the frame connection point of each upstream support member is in pivotal connection with one of the upstream connection points of the frame by one of the upstream pivots, the frame connection point of each downstream support member is in pivotal connection with one of the downstream connection points of the frame by one of the downstream pivots, the combined lengths of one of the upstream support members, one of the foils, and one of the downstream support members is greater than a distance from one of the upstream connection points to one of the downstream connection points along one of the frame axes, and the combined lengths of one of the upstream support members and one of the downstream support members is less than the distance from one of the upstream connection points to one of the downstream connection points along one of the frame axes;
wherein the fluid flow acts upon the plurality of foils, causing the plurality of foils to move together substantially perpendicular to the direction of the fluid flow in a reciprocating motion.

32. The device of claim 31 further comprising a force transfer mechanism;

wherein the force transfer mechanism has a first end and a second end, with the first end in connection with at least one of: the first foil support member, the second foil support member, one or more of the upstream support members, one or more of the downstream support members, one or more of the upstream pivots, one or more of the downstream pivots, one or more of the first foil support pivots, one or more of the second foil support pivots, one or more of the leading edge pivots, and one or more of the trailing edge pivots;

whereby movement of the foils causes movement of the first foil support member, the second foil support member, the upstream support members, the downstream support members, the upstream pivots, the downstream pivots, the first foil support pivots, the second foil support pivots, the leading edge pivots, and the trailing edge pivots, thereby resulting in movement of the force transfer mechanism.

33. The device of claim 32 further comprising a generator, wherein
the generator is suitably configured to convert movement into power; and
the second end of the force transfer mechanism is in connection with the generator;
whereby movement of the force transfer mechanism causes the generator to generate power.

34. The device of claim 31 wherein the frame is a unitary substantially rigid structure.

35. The device of claim 31 wherein the frame is a multi-component structure.

36. The device of claim 31 wherein the fluid flow is a current in a channeled body of water and the frame is anchored to a floor of the channel.

37. The device of claim 31 wherein the fluid flow is an ocean current and the frame is anchored to a floor of the ocean.

* * * * *